(12) United States Patent
Nollet

(10) Patent No.: US 9,698,622 B2
(45) Date of Patent: Jul. 4, 2017

(54) ENERGIZING HYDROGENERATOR

(71) Applicant: SAGEM DEFENSE SECURITE, Boulogne Billancourt (FR)

(72) Inventor: Michel Nollet, Boulogne Billancourt (FR)

(73) Assignee: Safran Electronics & Defense, Boulogne Billancourt (FR)

(*) Notice: Subject to any disclaimer, the term of this patent is extended or adjusted under 35 U.S.C. 154(b) by 68 days.

(21) Appl. No.: 14/440,574

(22) PCT Filed: Nov. 4, 2013

(86) PCT No.: PCT/EP2013/072883
§ 371 (c)(1),
(2) Date: May 4, 2015

(87) PCT Pub. No.: WO2014/068096
PCT Pub. Date: May 8, 2014

(65) Prior Publication Data
US 2015/0303738 A1   Oct. 22, 2015

(30) Foreign Application Priority Data

Nov. 2, 2012 (FR) .................. 12 60463
Nov. 8, 2012 (FR) .................. 12 60591

(51) Int. Cl.
*H02J 7/14* (2006.01)
*H02J 7/00* (2006.01)
(Continued)

(52) U.S. Cl.
CPC ............ *H02J 7/1415* (2013.01); *F03B 13/00* (2013.01); *F03B 17/061* (2013.01);
(Continued)

(58) Field of Classification Search
CPC ....... H02J 7/1415; H02J 7/0057; H02P 9/305; F03B 13/00; F03B 17/061; Y02E 10/28
(Continued)

(56) References Cited

U.S. PATENT DOCUMENTS 3,619,632 A * 11/1971 Labombarde .......... B63H 20/00
114/39.21
3,703,642 A * 11/1972 Balaguer .............. B63H 20/007
290/43
(Continued)

FOREIGN PATENT DOCUMENTS

GB    2 372 783 A    9/2002
GB    2 486 334 A    6/2012

*Primary Examiner* — Viet Nguyen
(74) *Attorney, Agent, or Firm* — Muncy, Geissler, Olds & Lowe, P.C.

(57) ABSTRACT

The invention relates to an on-board assembly for producing and storing electricity, including at least one hydrogenerator having an output line connected to at least one electrical battery having predetermined electrical load parameters. The hydrogenerator includes a load-bearing structure onto which a generator and an impeller, secured to a shaft for driving a rotor of the generator, are mounted. Said assembly is characterized in that the generator is an excitation generator, and the hydrogenerator includes a rectifier circuit, connecting the generator to the output line, and at least one circuit for exciting the generator. The excitation circuit is connected to an excitation current regulator controlled by a control unit set up so that the generator provides a load current consistent with the electrical load parameters on the basis of a resisting torque of the generator, said torque being predetermined so as to limit drag of the impeller.

10 Claims, 2 Drawing Sheets

(51) Int. Cl.
*F03B 13/00* (2006.01)
*F03B 17/06* (2006.01)
*H02P 9/30* (2006.01)
*B63J 3/04* (2006.01)

(52) U.S. Cl.
CPC ............ *H02J 7/0057* (2013.01); *H02P 9/305* (2013.01); *B63J 2003/046* (2013.01); *F05B 2240/931* (2013.01); *Y02E 10/28* (2013.01); *Y02T 70/70* (2013.01)

(58) Field of Classification Search
USPC ............................ 290/42, 43, 44, 53, 54, 55
See application file for complete search history.

(56) References Cited

U.S. PATENT DOCUMENTS

| | | | | |
|---|---|---|---|---|
| 4,825,139 A * | 4/1989 | Hamelin | ............... | H02J 7/1484 322/90 |
| 4,992,920 A * | 2/1991 | Davis | ................... | H02J 7/1438 322/32 |
| 6,508,191 B1 * | 1/2003 | Spoljaric | ................... | B63J 3/04 114/244 |
| 8,866,334 B2 * | 10/2014 | Donnelly | ................... | H02J 1/10 290/2 |
| 2004/0026930 A1 * | 2/2004 | Baggett | ...................... | B63J 3/04 290/54 |
| 2006/0108954 A1 * | 5/2006 | Sebille | ................... | F02N 11/04 318/108 |
| 2006/0131890 A1 * | 6/2006 | Gizara | ................. | F03B 17/065 290/43 |
| 2007/0046028 A1 * | 3/2007 | Gizara | ..................... | B63B 1/24 290/54 |
| 2008/0290663 A1 * | 11/2008 | Shifrin | ................. | F03B 13/105 290/52 |
| 2010/0295313 A1 * | 11/2010 | Chen | .................... | F03B 17/061 290/54 |
| 2011/0049882 A1 * | 3/2011 | Larsson | ..................... | B63J 3/04 290/43 |
| 2012/0211988 A1 * | 8/2012 | Harding | ................. | F03B 3/126 290/54 |
| 2013/0257347 A1 * | 10/2013 | Ou | ........................... | H02J 3/24 320/107 |
| 2014/0049229 A1 * | 2/2014 | Li | ........................... | H02J 3/32 322/39 |

* cited by examiner

ENERGIZING HYDROGENERATOR

BACKGROUND OF THE INVENTION

Field of the Invention

The present invention relates to an on-board assembly for producing and storing electricity, which can be used in particular on a sailing boat in order, for example, to supply the on-board electronic equipment.

Brief Discussion of the Related Art

Such an assembly generally comprises a hydrogenerator having an output line connected to electrical accumulators having predetermined electrical charging parameters. The hydrogenerator comprises a carrying structure on which a generator with permanent magnets and an impeller secured to a driveshaft of a rotor of the generator are mounted, so that the carrying structure can be fastened to the stern of a sailing boat while keeping the impeller submerged. The output of the generator is connected to a rectifier circuit connected to a DC/DC converter connected to the accumulators, in such a way that the hydrogenerator supplies the accumulators with a substantially constant DC voltage.

It will be understood that, when the sailing boat is in motion, the impeller turns under the effect of its movement in the water and drives in rotation the rotor of the generator, which then produces a current for charging the accumulators.

As the rotational speed of the impeller increases, the generator supplies more and more electrical power but, at the same time, generates a larger and larger resisting torque on the driveshaft of the motor. Thus, the resisting torque generated on the shaft of the impeller by the generator brakes the rotation of the impeller and prevents the impeller from reaching the rotational speed which it would have if it pivoted freely in the wake of the sailing boat. This results in drag which is detrimental to the performance of the sailing boat, in particular for competition sailing boats, and more particularly for racing at sea, for which the maximum speed is an essential characteristic.

In order to avoid this drawback, it is known to use a variable-pitch impeller. In this type of impeller, the blades are mounted on pivoting radial axles making it possible to modify the pitch of the impeller. Thus, with this type of impeller, the pitch of the impeller is increased in order to reduce the drag which it causes as the speed of the boat increases. Although this solution is attractive in terms of its principal, it is nevertheless complex to implement. The orientation control of the blades of the impeller employs an electromechanical actuator or an actuator with hydraulic means driven by a computer, so that this solution finally proves to be heavy and complex. Furthermore, despite this complexity, the desired result is only partially achieved because the means employed entail a long pitch correction time. This results in a significant variation of the output voltage of the generator, which makes the aforementioned DC/DC converter indispensable and means that the output voltage may reach high values. It is known to provide an electronic peak clipper in order to partially mitigate the latter drawback. Such a peak clipper makes the system even more complex, however, and when it is acting it consumes a high current at the clipping voltage as pure loss. This results in an energy loss and a superfluous increase in the resisting torque applied to the impeller, and therefore the drag (resistance to moving forward) which it produces. Furthermore, because of the very principle of an unregulated generator, the voltage of which cannot be reduced too much without having too high a current, and therefore heavy transport cables with a large cross section, and the easiest DC/DC converter to produce, which is a step-down converter, its output voltage is particularly high and considered dangerous for a user in a wet environment.

SUMMARY OF THE INVENTION

It is an object of the invention to provide a simple means for limiting the drawbacks of systems with a hydrogenerator.

To this end, according to the invention, an on-board assembly for producing and storing electricity is provided, comprising at least one hydrogenerator having an output line connected to at least one electrical accumulator having predetermined electrical charging parameters. The hydrogenerator comprises a carrying structure on which a generator and an impeller secured to a driveshaft of a rotor of the generator are mounted. The generator is an excitation generator and the hydrogenerator comprises a rectifier circuit connecting the generator to the output line, and at least one circuit for excitation of the generator. The excitation circuit is connected to an excitation current regulator driven by a control unit arranged so that the generator supplies a charging current corresponding to the electrical charging parameters as a function of a predetermined resisting torque of the generator in order to limit drag of the impeller.

With a constant excitation current, there would be the same drawback as with the constant induction of a permanent-magnet generator, that is to say the resisting torque generated by the generator on the driveshaft would increase as the rotational speed of the impeller increases. In the invention, the excitation current of the generator is regulated in order, at the same time, to ensure charging of the battery while keeping the drag within acceptable limits in relation to the speed of the vessel equipped with the system of the invention. This advantage is obtained without resorting to a variable-pitch impeller controlled by a complex system.

According to particularly advantageous characteristics of the invention, the accumulator is of the Li ion type and accepts, under a predetermined maximum charging voltage, a charging current with a predetermined maximum charging strength, the control unit driving the current regulator so as to maintain a voltage as close as possible to the predetermined maximum charging voltage and to regulate the charging current as a function of the predetermined resisting torque.

Li ion accumulators have particularly advantageous storage performances in relation to their weight, so that they are highly suitable for use on boats such as competition sailing boats. These accumulators, however, are extremely sensitive to the charging conditions, which, if they are not adapted to this type of accumulator, cause heating thereof or "thermal runaway" thereof. The excitation circuit is for its part arranged in order, at the end of charging, to bring the output voltage of the generator close to the maximum charging voltage in order to ensure optimal charging without running the risk of damaging the accumulator. The determination of the resisting torque generated by the generator derives from the regulation of the output strength of the generator, the Li ion accepting a large range of charging strengths.

Preferably, the assembly comprises means for detecting rotation of the impeller, and the control unit is connected to the detection means in order to bring the excitation circuit into a rated operating mode when rotation of the impeller is detected by the detection means, and the control unit is advantageously arranged in order to bring the excitation circuit into the rated operating mode when the impeller has a rotational speed higher than a threshold.

Since the operation of the excitation generator relies on the supply of an excitation current, supplying the excitation circuit when the impeller is stationary or not rotating at a sufficient speed leads to superfluous consumption of electricity. The invention makes it possible to avoid such overconsumption.

Other characteristics and advantages of the invention will become apparent on reading the following description of nonlimiting particular embodiments of the invention.

BRIEF DESCRIPTION OF THE DRAWINGS

Reference will be made to the appended figures, in which:

Referring to FIG. 1, the assembly according to the invention for producing and storing electricity is on board a boat B, and more particularly a sailing boat.

DETAILED DESCRIPTION OF THE PREFERRED EMBODIMENTS

Figure 1:
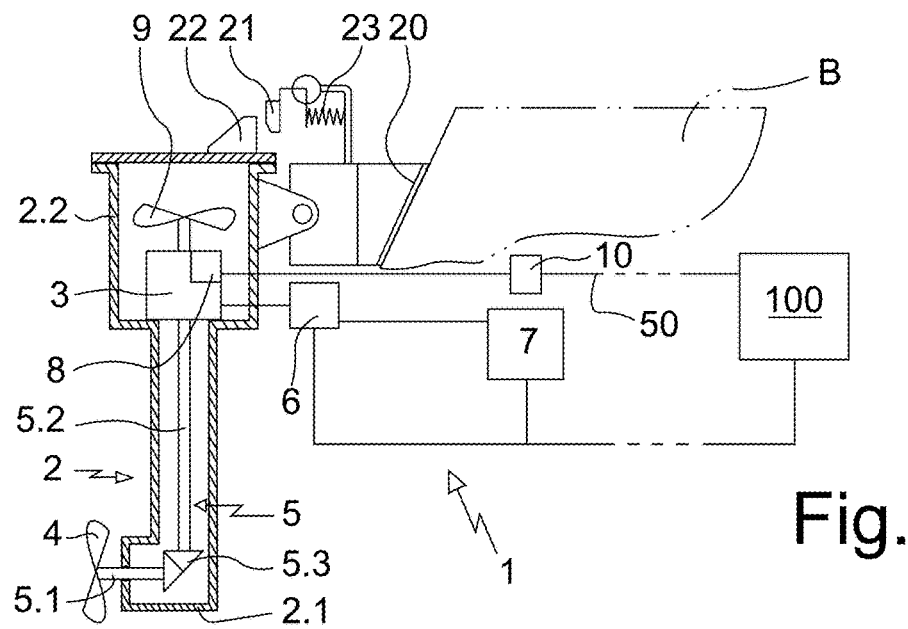
FIG. 1 is a schematic view of an assembly according to the invention for producing and storing electricity.

The on-board assembly for producing and storing electricity comprises at least one hydrogenerator, denoted overall by 1, having an output line 50 connected to batteries of electrical accumulators 100.

The electrical accumulators 100 are of the Li ion type and have predetermined electrical charging parameters. More precisely, the accumulators 100 accept a charging current with a maximum strength Imax less than or equal to 300 A under a maximum charging voltage Umax of 28.6 V.

The hydrogenerator 1 comprises a carrying structure 2 on which a generator 3 and a fixed-pitch impeller 4, secured to a shaft of a line of shafts 5.1, 5.2 for driving a rotor of the generator 3 in rotation, are mounted.

A rectifier circuit 8 connects the generator 3 to the output line 50. The rectifier circuit 8 is in this case produced directly on the generator 3. Since the hydrogenerator 1 comprises a fan 9 driven by the shaft 5 in order to generate an air flow over the generator 3, so as to cool it, the rectifier circuit 8 is positioned on the generator 3 so as to be subjected to said air flow. As a variant, the hydrogenerator may comprise an auxiliary fan driven by the shaft 5 and positioned in order to specifically cool the rectifier circuit, in particular when the latter is in a position in which it is masked from the air flow generated by the fan 9.

In the embodiment described here, the carrying structure 2 comprises a pylon having a submersible first end 2.1 and a second end 2.2 which is arranged in order to remain unsubmerged and is equipped with means for fastening the carrying structure 2 to the boat B. The impeller 4 is mounted on the first end 2.1 of the carrying structure 2, and the generator 3 is mounted on the second end 2.2 of the carrying structure 2. The generator 3 is therefore always out of the water and does not increase the drag of the boat B. It is possible to use a high-power generator 3, which is therefore relatively large, without impeding the running of the boat B.

The carrying structure 2 comprises a leaktight hood on which the majority of the driveline of the generator 3 and the generator 3 itself are received. In the arrangement described above, the driveline comprises a first driveshaft 5.1 mounted in order to pivot in the first end 2.1 of the carrying structure 2, and a second driveshaft 5.2 which is mounted in order to pivot in the pylon and extends from the first end 2.1 to the second end 2.2 of the carrying structure 2. The first shaft 5.1 has one end which extends protruding out of the hood and carries the impeller 4, and one end which extends inside the hood and is connected to a bell crank 5.3. The hood is provided with sealing means cooperating with the first shaft 5.1 in order to avoid the introduction of water into the hood. The second driveshaft 5.2 has a lower end connected to the bell crank 5.3 and an upper end coupled to the rotor of the generator 3. A seal has been added at the bottom of the shaft 5.2, the idea being that if the seal behind the impeller lets some water through, this water cannot ever reach the generator even when the hydrogenerator is put in the raised position. Likewise, if some water comes into the upper part, it cannot enter the gearbox. The generator 3 is therefore positioned along a substantially vertical axis in this case. The bell crank has a transmission of 1 here, although it may have a transmission greater than or less than 1 depending on the characteristics of the generator 3 and of the impeller 4. In particular, it may be advantageous to make the impeller 4 turn less rapidly than the rotor of the generator 3, particularly in order to avoid the occurrence of a cavitation phenomenon around the impeller 4.

The fastening means comprise a base 20 provided with a directional articulation with a substantially vertical axis in order to allow automatic alignment of the impeller 4 with the direction in which the boat B is moving, and a lifting articulation with a substantially horizontal axis allowing the user alternately to extract and submerge the first end 2.1 of the carrying structure 2, according to his requirements.

The fastening means furthermore comprise a pawl 21 secured to the base 20 in order to cooperate with a ratchet 22 secured to the hood of the carrying structure so as to keep the carrying structure 2 in its position with the first end 2.1 submerged, opposing the lifting force exerted by the water on said end because of the movement of the boat B. The pawl 21 thus takes up the forces due to the drag of the end 2.1 and of the impeller 4 in the water. The pawl 21 can in this case pivot between a low position blocking the carrying structure 2 in the submerged position and a high position releasing the ratchet 22, allowing the carrying structure 2 to be raised. The pawl 21 is held in its blocking position by a resilient member 23 such as a coil spring or a stack of resilient washers of the Belleville type, in such a way that if the end 2.1 strikes a floating object such as a marine mammal or a small iceberg (more commonly known as a growler), the pressure of the ratchet 22 against the pawl 21 forces the pawl 21 into a position of forced release against the force exerted by the resilient member 23.

Figure 2A:
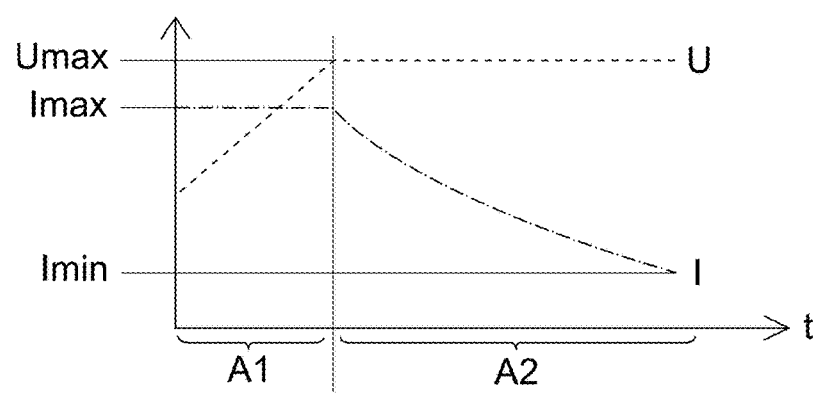
FIG. 2a is a diagram representing the voltage U and the strength I of the current on the output line of the generator as a function of time.
Figure 2B:
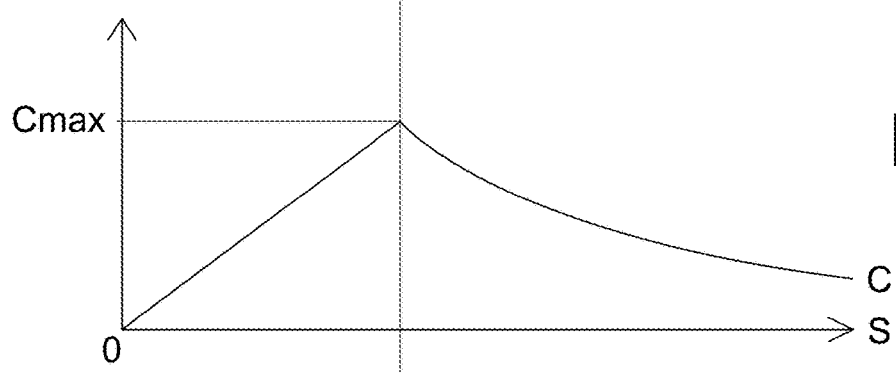
FIG. 2b is a diagram representing the resisting torque C produced by the generator as a function of the rotational speed S of the driveshaft of the rotor.

The generator 3 is an excitation alternator of the type known per se, which has at least one winding connected to an excitation circuit of the generator. The excitation circuit comprises an excitation current regulator, symbolized by 6, connected to the accumulators 100 and driven by a control unit 7 arranged so that the generator 3 supplies a charging current corresponding to the electrical charging parameters as a function of a resisting torque C of the generator 3 predetermined in order to limit drag of the impeller 4. In this case, the control unit 7 is more precisely arranged in order to obtain on the output line 50 a voltage U (represented by a dashed line in FIG. 2a) as close as possible to the predetermined maximum charging voltage Umax and in order to regulate the strength I of the charging current (represented by a dot-and-dash line in FIG. 2a) as a function of the predetermined resisting torque C (represented by a continuous line in FIG. 2b).

It will be understood that, when the impeller 4 is submerged, the control unit 7 drives the current regulator 6 so that the excitation circuit in a rated operating mode is subjected to an excitation current having a strength varying between a minimum value and a maximum value. The maximum value corresponds to a low rotational speed S of the impeller 4, when the voltage U generated on the output line 50 is less than Umax and the intention is therefore to produce a current having the highest possible strength (region A1 of FIG. 2a). The minimum value corresponds to a high rotational speed S of the impeller 4, when the voltage on the output line 50 is equal to Umax and the intention is therefore to produce a current having a strength which is lower (ranging down to Imin) but sufficient to reach the maximum charging power (region A2 of FIG. 2a). The resisting torque C generated by the generator 3 on the driveshaft 5 as a function of the rotational speed S of the impeller 4 increases in region A1 until it reaches its maximum acceptable value Cmax, then decreases in region A2 (see FIG. 2b). Thus, the control unit 7 is arranged so that the generator supplies a charging current corresponding to the electrical charging parameters as a function of the resisting torque of the generator 3 predetermined in order to limit drag of the impeller 4.

The architecture described above is sufficient to ensure charging of the batteries 100. However, it is necessary always to supply the excitation circuit 6 with a current of strength at least equal to Imin, including when the submerged impeller 4 is stationary or turning at a speed which is insufficient to drive the rotor of the generator 3 at the minimum speed necessary in order to comply with the predetermined electrical charging parameters. This, however, results in superfluous consumption of electricity when the submerged impeller 4 is stationary or turning at an insufficient speed.

In order to avoid this superfluous consumption, provision is advantageously made to detect the speed of the impeller 4 and to activate the production of a charging current only when the rotational speed of the impeller 4 is sufficient.

The speed measurement is based here on detecting the voltage of the output line, the value of this voltage being connected with the rotational speed S of the rotor and therefore of the impeller 4. It is known that the remanent magnetism of the irons of the rotor generates an output voltage of the generator 3 when the rotor is driven in rotation, even if the excitation circuit is not being supplied. This is sufficient in order to detect the impeller being set in rotation, by means of a voltage detector 10 connected to the control unit 7. When a voltage is detected on the output line 50, the control unit 7 drives the current regulator 6 in order to supply the excitation circuit in its rated operating mode.

The self-excitation of the generator 3 is, however, random because the remanent magnetism in the irons of the rotor is not constant. A standby mode of the excitation circuit is therefore provided, in which the excitation circuit is supplied via the current regulator 6 with a current of reduced strength (for example between 5 and 10 mA) so that rotation of the impeller 4 at a predetermined rotational speed sufficient for the generator to start to generate a current corresponding to the charging parameters generates a voltage which is itself predetermined (for example 0.5 volt at 1000 rpm). Thus, the impeller being set in rotation generates an increase in voltage at the output of the generator 3, which can be detected by the detection member 10. The voltage detector 10 connected to the control unit 7 is more particularly connected to a voltage comparator arranged in the control unit 7 in order to compare the voltage of the output line with a reference voltage (for example 0.5 volt) and to emit a signal when the voltage of the output line is greater than the reference voltage. When this signal is emitted, the control unit drives the current regulator 6 in order to bring the excitation circuit into its rated operating mode. The generator 3 then supplies an adequate charging current to the batteries of electrical accumulators 100.

Figure 3:
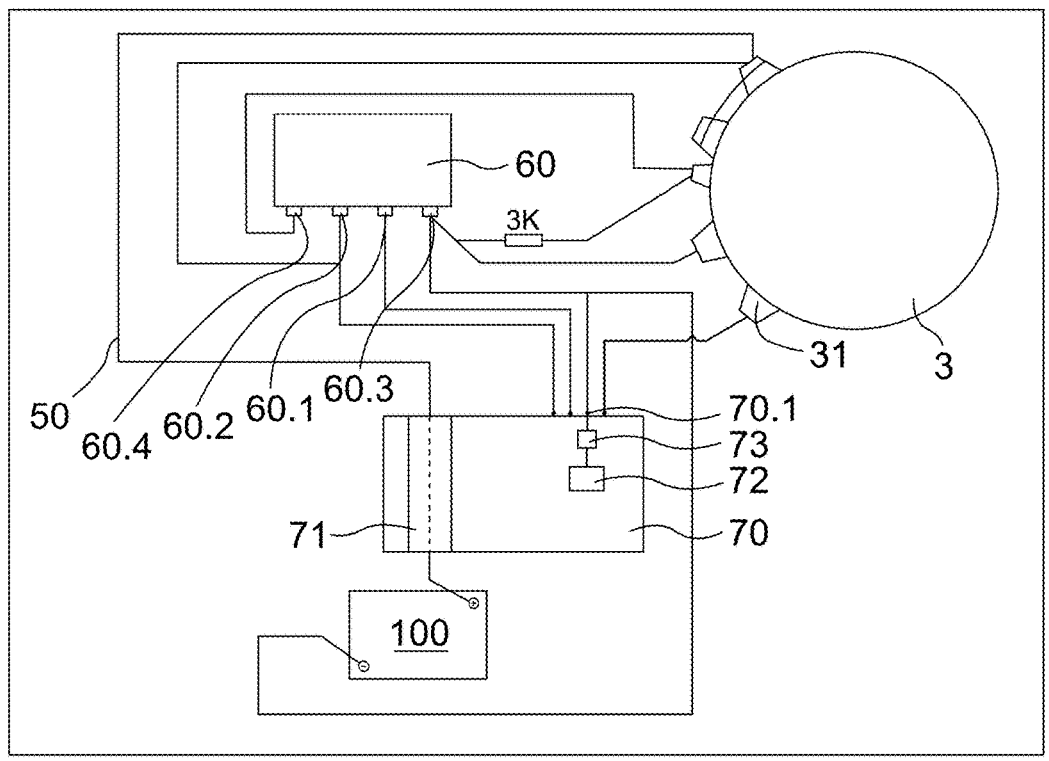
FIG. 3 is a schematic representation of a particular embodiment of the drive unit.

In one particular embodiment, which is represented in FIG. 3, a voltage regulator 60, for example of the PWM type, arranged conventionally in order to charge accumulators while monitoring their voltage, is used in order to regulate the excitation current. The voltage regulator 60 regulates the excitation current as a function of the voltage of the accumulators 100 so as to limit the charging of the accumulators 100 in order to avoid thermal runaway thereof. The voltage regulator 60 comprises an input 60.1 receiving the voltage signal of the accumulators 100, an input 60.2 connected to the supply line 50, a port 60.3 connected to the ground and an output 60.4 connected to the excitation circuit. When the voltage signal at the input 60.1 corresponds to Umax, the voltage regulator 60 reduces or cuts off the excitation of the generator 3.

A voltage regulator 70 is connected to a Hall-effect detector 71 mounted on the output line 50 in order to supply the voltage regulator 70 with a voltage signal proportional to the current flowing through the output line 50. This voltage signal is processed (for example in order to remove the offset error of the Hall-effect sensor 71 therefrom and to amplify the voltage signal) before being used by the voltage regulator 70. The output 70.1 of the voltage regulator 70 is connected to the input 60.1. Inside the voltage regulator 70, there is an OR cell with diodes, receiving at its input on the one hand the voltage signal proportional to the current and on the other hand the voltage signal of the accumulators 100. The output of the OR cell 72 is connected to the output 70.1. The OR with diodes may be produced by means of signal diodes or Schottky diodes with a low threshold voltage. If it is desired to reduce the threshold voltage further, the "or with diodes" function may be produced not with diodes but with transistors (for example MOSFET) controlled so that they fulfil the "or with diodes" function, or integrated circuits fulfilling this function.

Thus, the voltage signal which is used for the regulation carried out by the voltage regulator 60 is the higher of the two signals received at input, namely the voltage signal proportional to the current and the voltage signal of the accumulators 100. It is in this way possible to force the voltage regulator 60 to limit or cut off the excitation of the generator 3 even though the voltage of the accumulators 100 has not reached Umax.

The coupling of these two regulators thus makes it possible to ensure voltage regulation and current regulation.

The taking into account of the rotational speed of the impeller, and the supply of the excitation circuit when a predetermined speed is reached, are obtained by using a free output 31 of the alternator 3 having its own rectifier diodes, so that the voltage there depends on the rotational speed of the rotor of the generator 3 while the voltage of the main output 50 is that of the battery, and by comparing the voltage (which appears when the impeller turns) with a reference voltage (for example 0.5 volt) in order to drive a switch 73 connected between the output of the OR cell 72 and the output 70.1, the switch 73 being on when the voltage of the output line is greater than the reference voltage.

Various ways of fastening the impeller on the driveshaft may be envisioned. Provision is preferably made that blocking of the impeller does not cause the impeller or the line of shafts to break. Thus, in order to avoid damage to the impeller 4 and/or the line of transmission shafts 5 and/or the generator 3 when the impeller 4 is blocked in rotation by an obstacle, such as a hard object or a net or a rope, provision is made here for the impeller to be screwed onto the driveshaft with a screw pitch oriented in such a way that the impeller 4 tends to be tightened when driven in rotation by the flow. At the moment when the obstacle blocks the impeller 4 in rotation, the rotor of the generator will become a driver for a short time under the effect of its inertia, which will reverse the torque transmitted and will simply cause unscrewing of the shaft relative to the impeller 4 blocked in rotation. Normally, the impeller is not fully unscrewed because of this untightening. Nevertheless, an axial stop is preferably provided, preventing the fully unscrewed impeller from leaving the shaft and being lost, but without preventing rotation of the driveshaft with respect to the impeller. This characteristic is particularly beneficial in combination with the generator of the invention, but it may also be applied to other types of generator.

The invention is not of course limited to the embodiments described, but covers any variant falling within the field of the invention as defined by the claims.

In particular, the hydrogenerator may have a structure different to that described.

Advantageously, the impeller may be oriented toward the front of the pylon, so that the impeller is not masked by the pylon or by the generator when the latter is mounted on the submerged end portion of the pylon. This is particularly beneficial in the latter case, particularly when the generator is large, because the generator significantly restricts the flow to which the impeller is subjected. The efficiency of the impeller is improved, and the speed of the impeller is more constant. This characteristic is particularly beneficial in combination with mounting of the impeller toward the front and with the generator according to the invention, but it may also be applied to rearward mounting and/or other types of generator.

The measurement of the speed of the impeller may be obtained by measuring the value or the frequency of the voltage produced by the alternator or by a dedicated sensor mounted on the driveshaft of the rotor.

The start-up when the impeller turns may be carried out by self-excitation of the alternator instead of the externally originating excitation which has been selected here.

The hydrogenerator may comprise a detector detecting submerging of the impeller, making it possible to supply the electricity production assembly (control unit and current regulator in particular) only when the impeller is submerged. This sensor may be in the form of a switch arranged on the unsubmerged end of the carrying structure 2 in order to cooperate with a part secured to the boat when the first end of the carrying structure 2 is brought from its unsubmerged position into its submerged position.

The assembly according to the invention may comprise two or N hydrogenerators connected to the accumulator and capable of operating simultaneously. The slaving described above, which controls the excitation current so as to reduce the drag of each impeller and so that the maximum voltage that can be accepted by the battery is never exceeded, will in this case ensure both a charging current which is doubled (or multiplied by N) so long as the maximum voltage of the battery has not been reached, but also compliance with the limiting voltage by reducing the excitations of the two or N generators. In the latter case, both (or all N) of the generators will supply a part of the charging current, in such a way that the sum of the charging currents just reaches the current value which produces the desired charging voltage across the terminals of the battery.

The generator may be mounted on the submersible end of the carrier structure if its cross section is not an impediment (other words if it does not excessively increase the drag).

The generator may comprise one or more windings.

The hydrogenerator may comprise one or more lights showing that it is operating correctly.

The electrical production and storage assembly of the invention may comprise accumulators of a type other than Li ion accumulators, and in particular lead accumulators, Ni—Cd accumulators or alternatively Ni-MH accumulators, etc.

The invention claimed is:

1. An on-board assembly for producing and storing electricity, comprising:
   at least one hydrogenerator having an output line connected to at least one electrical accumulator having predetermined electrical charging parameters, the at least one hydrogenerator comprising:
   a carrying structure on which a generator and an impeller secured to a drive shaft of a rotor of the generator are mounted, wherein the generator is an excitation generator;
   a rectifier circuit connecting the generator to the output line; and
   at least one circuit for excitation of the generator, the at least one excitation circuit being connected to an excitation current regulator driven by a control unit arranged so that the generator supplies a charging current corresponding to the electrical charging parameters as a function of a predetermined resisting torque of the generator in order to limit drag of the impeller, wherein the rectifier circuit is produced directly on the generator; and
   a fan driven by the drive shaft in order to generate an air flow over the generator, wherein the rectifier circuit is positioned in order to be subjected to the air flow.

2. An on-board assembly for producing and storing electricity, comprising:
   at least one hydrogenerator having an output line connected to at least one electrical accumulator having predetermined electrical charging parameters, the at least one hydrogenerator comprising:
   a carrying structure on which a generator and an impeller secured to a driveshaft of a rotor of the generator are mounted, wherein the generator is an excitation generator;
   a rectifier circuit connecting the generator to the output line; and
   at least one circuit for excitation of the generator, the at least one excitation circuit being connected to an excitation current regulator driven by a control unit arranged so that the generator supplies a charging current corresponding to the electrical charging parameters as a function of a predetermined resisting torque of the generator in order to limit drag of the impeller; and
   means for detecting rotation of the impeller, and the control unit being connected to the means for detecting rotation in order to bring the excitation circuit into a rated operating mode when rotation of the impeller is detected by the means for detecting rotation,
   wherein the rotation detection is obtained by detecting a voltage on the output line, and the control unit is arranged in order to maintain the excitation circuit in a standby mode when the impeller is stationary or has a rotational speed lower than a threshold, the excitation circuit being supplied in the standby mode with a current of strength of less than the strength of the current supplying the excitation circuit in rated operating mode.

3. An on-board assembly for producing and storing electricity, comprising:
two or N hydrogenerators each having an output line connected to at least one electrical accumulator having predetermined electrical charging parameters, each hydrogenerator comprising:
a carrying structure on which a generator and an impeller secured to a driveshaft of a rotor of the generator are mounted, wherein the generator is an excitation generator;
a rectifier circuit connecting the generator to the output line; and
at least one circuit for excitation of the generator, the at least one excitation circuit being connected to an excitation current regulator driven by a control unit arranged so that the generator supplies a charging current corresponding to the electrical charging parameters as a function of a predetermined resisting torque of the generator in order to limit drag of the impeller,
wherein, if the generators are operating simultaneously, the excitation circuits are arranged in such a way that the charging current is doubled or multiplied by N as long as the maximum voltage of the battery is not reached, and that the generators distribute the total charging current necessary to maintain the battery at its maximum charging voltage when this voltage is reached.

4. The assembly as claimed in claim 1 or claim 2 or claim 3, wherein the accumulator is of the Li ion type accepting, under a predetermined maximum charging voltage, a charging current with a predetermined maximum charging strength, the control unit driving the excitation current regulator so as to maintain a voltage as close as possible to the predetermined maximum charging voltage and to regulate the charging current as a function of the predetermined resisting torque.

5. The assembly as claimed in claim 1 or claim 3, comprising means for detecting rotation of the impeller, and the control unit being connected to the detection means in order to bring the excitation circuit into a rated operating mode when rotation of the impeller is detected by the detection means.

6. The assembly as claimed in claim 5, wherein the control unit is arranged in order to bring the excitation circuit into the rated operating mode when the impeller has a rotational speed higher than a threshold.

7. The assembly as claimed in claim 1 or 2 or 3, wherein, the impeller being mounted at a first end of the carrying structure which is arranged so as to be submersible, the generator is mounted at a second end of the carrying structure which is arranged in order to remain unsubmerged and is equipped with means for fastening the carrying structure to a vessel, the fastening means comprising a directional articulation with a substantially vertical axis.

8. The assembly as claimed in claim 7, wherein the fastening means also comprise a lifting articulation with a substantially horizontal axis, making it possible alternately to extract and submerge the first end of the carrying structure.

9. The assembly as claimed in claim 7, wherein the impeller can be oriented toward the front of the carrying structure.

10. The assembly as claimed in claim 7, wherein the impeller is screwed onto the driveshaft with a screw pitch oriented in such a way that the impeller tends to be tightened when driven in rotation by the flow.

* * * * *